(12) United States Patent
Dellupi et al.

(10) Patent No.: US 9,316,261 B2
(45) Date of Patent: Apr. 19, 2016

(54) LINEAR GUIDE SYSTEM

(71) Applicant: NADELLA S.r.l., Milan (IT)

(72) Inventors: Andrea Dellupi, Sesto San Giovanni (IT); Fulvio Silvio Gino Tondelli, Milan (IT)

(73) Assignee: NADELLA S.R.L., Milan (IT)

( * ) Notice: Subject to any disclaimer, the term of this patent is extended or adjusted under 35 U.S.C. 154(b) by 0 days.

(21) Appl. No.: 14/615,663

(22) Filed: Feb. 6, 2015

(65) Prior Publication Data

US 2015/0226267 A1      Aug. 13, 2015

(30) Foreign Application Priority Data

Feb. 10, 2014   (IT) .............. MI2014A0187

(51) Int. Cl.
*F16C 29/04* (2006.01)
*F16C 39/02* (2006.01)
*F16C 29/08* (2006.01)

(52) U.S. Cl.
CPC ............. *F16C 39/02* (2013.01); *F16C 29/045* (2013.01); *F16C 29/084* (2013.01)

(58) Field of Classification Search
CPC ....... F16C 29/005; F16C 29/045; F16C 29/12
USPC ................. 384/50, 52, 55, 58, 59, 445, 548, 384/564–565, 549, 562
See application file for complete search history.

(56) References Cited

U.S. PATENT DOCUMENTS

| | | | | |
|---|---|---|---|---|
| 447,015 A | * | 2/1891 | Reiss ................... | 184/5 |
| 2,907,610 A | * | 10/1959 | Wise ..................... | 384/55 |
| 3,925,933 A | * | 12/1975 | Reuter ................... | 49/409 |
| 4,447,095 A | * | 5/1984 | Fielding ................ | 384/19 |
| 4,588,049 A | * | 5/1986 | Haas ..................... | 187/324 |
| 4,779,678 A | * | 10/1988 | White .................... | 166/241.3 |
| 4,806,027 A | * | 2/1989 | Tomlinson et al. ..... | 384/50 |
| 5,070,575 A | | 12/1991 | Redman | |
| 5,580,174 A | * | 12/1996 | Houck ................... | 384/19 |

(Continued)

FOREIGN PATENT DOCUMENTS

DE    92 11 775.9 U1    11/1992
DE    9211775             11/1992

(Continued)

OTHER PUBLICATIONS

European Search Report issued in corresponding Italian Patent Application No. MI2014A000187, filed Feb. 10, 2014.
European Search Report dated Jul. 7, 2015 for EP 15 15 4258.

*Primary Examiner* — Marcus Charles
(74) *Attorney, Agent, or Firm* — Lucas & Mercanti, LLP.

(57) ABSTRACT

Linear guide system has a guide element and one or more rotating bodies, movable according to a linear motion along the guide element and constrained to a structure to be supported and moved along the guide element. Each rotating body has at least one roller with an outer ring resting on a contact surface of the guide element, and at least one substantially cylindrical stem. At least one safety supporting device is connected to a structure to be supported and the one or more relating bodies. Under the normal load conditions of the linear guide system, the safety supporting device allows for the normal linear motion of the rollers along the contact surface. When load higher than a given threshold is applied on the linear guide system, the safety supporting device rests on the contact surface, discharging the load there.

10 Claims, 3 Drawing Sheets

(56) References Cited

U.S. PATENT DOCUMENTS

| | | | |
|---|---|---|---|
| 5,820,269 A * | 10/1998 | Ariga | 384/53 |
| 5,893,619 A * | 4/1999 | Nachbaur | 312/334.44 |
| 6,371,647 B1 | 4/2002 | Koyama | |
| 6,450,687 B1 * | 9/2002 | Schroeder et al. | 384/50 |
| 7,228,659 B2 * | 6/2007 | Romero et al. | 49/409 |
| 8,070,361 B2 * | 12/2011 | Schroeder | 384/57 |
| 2005/0180737 A1 * | 8/2005 | Kurita et al. | 392/418 |

FOREIGN PATENT DOCUMENTS

| | | |
|---|---|---|
| DE | 4334373 | 4/1995 |
| DE | 102004050706 A1 | 4/2006 |
| EP | 0298021 | 1/1989 |
| EP | 0298021 A1 | 1/1989 |
| EP | 0387168 | 9/1990 |
| EP | 0387168 A1 | 9/1990 |
| WO | 2006094734 | 9/2006 |

\* cited by examiner

LINEAR GUIDE SYSTEM

CROSS-REFERENCE TO RELATED APPLICATIONS

The present application claims the priority of Italian Patent Application No. MI2014A000187, filed Feb. 10, 2014, the contents of which are incorporated herein by reference.

FIELD OF THE INVENTION

The present invention refers to a mechanical linear guide system, in particular a mechanical linear guide system of the roller type.

BACKGROUND OF THE INVENTION

As known, a mechanical linear guide system is made of one or more units that slide on rectilinear guides under specific load, speed and acceleration conditions depending on the application. The most widespread sliding units of such mechanical linear guide systems are usually made of recirculating ball or roll carriages, of friction systems or of roller systems.

The sliding units made of recirculating ball or roll carriages can withstand high loads and accelerations, but have the drawback of suffering from clogging phenomena of the recirculation channel in work environments particularly polluted by dirt and dust, as well as being sensitive to misalignment. The friction systems, such as, for example, the so-called sliding or guiding "gibs", can move large loads but suffer from problems relating to wear and cannot be used in applications where, in addition to a high load, relevant speeds are also requested.

Compared to the sliding units listed above, the linear guide roller systems have the advantage of having great flexibility and versatility of use in any environment and under operating conditions. However, even such linear guide roller systems can have at least one drawback due to possible overloads weighing on the roller themselves. If subjected to excessive loads, in fact, the rollers and/or related supporting components may break, resulting in the malfunction of the entire mechanical linear guide system and potential risks to users.

In the field of linear guide roller systems, devices auxiliary to the guide system itself have therefore been made, the function of which is to relieve the rollers of a part or the totality of the applied load, so as to avoid breakage due to the overload of one or more of the respective supporting components. These auxiliary devices are not, however, an integral part of the linear guide system, but are made of external components that intervene in certain situations in which the sole rollers would not be able to withstand the load applied to them. Such auxiliary devices may be made of, for example, load balancing or compensation devices by means of hydraulic or pneumatic cylinders, or of peak load damping devices that operate by means of shock absorbers.

Document EP 0 298 021 A1 relates to a system for the translation of sliding doors. The system comprises a carriage that slides in a respective guide. The carriage rests on a series of rotating elements configured to best distribute the load. In particular, in document EP 0 298 021 A1 there are described four rotating elements that rotate around an axis perpendicular to the translation direction of the carriage and that set such a carriage apart from the guide, avoiding premature wear caused by friction. Document EP 0 298 021 A1 therefore relates to a linear guide system, but the aims are to increase the possible weight of the door to slide, to have greater stability of the structure during movement, and to prevent wear due to the friction of the guide. In document EP 0 298 021 A1, in fact, no reference is ever made to any system of absorption of the overload that would inevitably lead to the breakage of the linear guide system. Document U.S. Pat. No. 5,070,575 A also relates to a system for the suspension and the translation of sliding doors of considerable weight when no reference is ever made to any overload absorption system.

Document DE 92 11 775 U1 relates to a linear guide system with variable preload, in which the adjustment takes automatically place through the possibility of moving the stem of one of the rollers. This movement is possible thanks to the presence of a deformable bushing, manufactured in plastic material. The aim of document DE 92 11 775 U1 is thus to perform the adjustment of a linear translation roller system, whereas the mechanical linear guide system according to the present invention provides neither the preload, nor the adjustment, but is configured to withstand both the normal load weighing on the rollers, and a possible extraordinary load which, for a normal linear translation system, could not be opposed effectively.

Document WO 2006/094734 A1 relates to a linear guide roller system wherein the possibility of self-adjusting the rollers is provided. This avoids problems of parallelism of the guides when such guides are mounted facing one another. In document WO 2006/094734 A1, the possibility of setting self-adjusting carriages is discussed, but not the load difference that can be withstood by a mechanical linear guide system of the roller type.

Document EP 0 387 168 A1 relates to a system to support and easily move loads on a plane through the use of numerous retractable hydraulic elements. Each retractable element is usually made of a sphere or a small disc that allows to direct the motion of the element itself when resting on a plane. The plane therefore comprises numerous retractable hydraulic elements, made in the form of small pistons, the task of which is to both support different load entities, and to allow the translation of the object to be supported and bring it to the desired position. The translation and the support of high loads therefore occur by contact between a fixed part and a mobile part, precisely made of the small pistons. The system described in document EP 0 387 168 A1 is typically applied on the working plane of machine tools. Unlike the system described in document EP 0 387 168 A1, the mechanical linear guide system according to the present invention is configured to support a given and/or sudden load of exceptional extent without there being mobile parts. The failure, understood as the approach of the prismatic casing to the guide on which the forces are discharged, only occurs by elastic deformation of the components (roller stems) and not by movement of any mobile part. Having mobile parts involves the drawback of increasing the wear of the components that scrape one another. Moreover, having mobile parts necessarily leads to their design and construction outside the linear guide system, which increases the costs and potentially the overall dimensions as well.

Finally, document DE 43 34 373 A1 relates to a system for moving a workpiece or a tool on a machine tool. The aim is to replace the linear translation systems of the friction or recirculation type with a roller system, as the drawbacks consist of a greater fluidity of movement and speed, in less friction and therefore less thrust force and less wear of the parts in contact. Once the working area has been reached, in order to ensure greater stability, the system provides for the support of a carriage on the machine's structure so as to have greater rigidity during operation. Such a system is similar to that described in document EP 0 387 168 A1. On the contrary, in the mechanical linear guide system according to the present invention, there is no particular area where the system itself may come into operation, but the force that is generated in the contact between the prismatic casing and the guide can be discharged at any time, anywhere along the guide.

SUMMARY AND OBJECTS OF THE INVENTION

The object of the present invention is to, therefore, make a mechanical linear guide system, in particular of the roller type, which is capable of solving the above drawbacks of the known art in an extremely simple, economical and particularly functional manner.

In detail, an object of the present invention is to make a mechanical linear guide roller system, which, dimensioned to support the normal workload to be translated, is also capable of absorbing the possible overloads of the rollers themselves, preventing their failure, without requiring the intervention of auxiliary devices.

Another object of the present invention is to make a compact mechanical linear guide roller system, wherein the overall dimensions are not excessively altered compared to a similar linear guide system of the known type.

These objects according to the present invention are achieved by making a mechanical linear guide system, in particular of the roller type, as outlined herein.

Further characteristics of the invention are highlighted by the claims, which are an integral part of the present description.

In detail, the objects according to the present invention are achieved by making a linear guide system comprising one or more rotating elements, provided with rollers, operatively connected to a safety supporting device. The safety supporting device is designed with dimensions and a geometric section such that, in the event of an exceptional load, for which one of the components of the rotating elements could break, this safety supporting device would rest on the linear guide, thus avoiding the failure of the rotating elements and/or of the related components.

BRIEF DESCRIPTION OF THE DRAWINGS

The characteristics and advantages of a mechanical linear guide system, in particular of the roller type, according to the present invention, will become more evident from the following exemplifying but not limiting description, referring to the accompanying schematic drawings, in which.

DETAILED DESCRIPTION OF THE INVENTION

Figure 1:
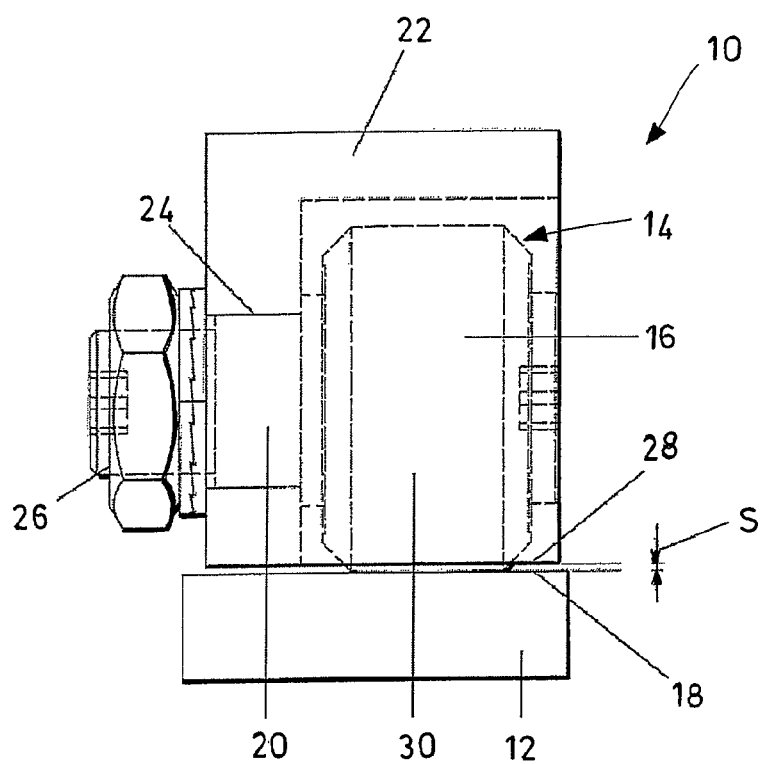
FIG. 1 is a side elevation view of a first embodiment of the mechanical linear guide roller system according to the present invention, provided with a single roller and a related flat guide.

With reference to the figures, there are shown some preferred embodiments of the mechanical linear guide roller system according to the present invention, wholly indicated by reference numeral 10. The linear guide system 10 comprises a guide element 12, made of, for example, a flat guide with a rectangular section in the embodiment shown in FIG. 1. The linear guide system 10 therefore comprises one or more rotating bodies 14 movable according to a linear motion along the guide element 12 and constrained to a structure (not shown) to be supported and moved along such a guide element 12.

In detail, each rotating body 14 comprises at least one roller 16 provided with an outer ring 30, the surface of which rotates resting on a contact surface 18 of guide element 12. As shown in FIG. 1, in the first embodiment of the linear guide system 10, the outer ring 30 of each roller 16 is substantially cylindrical-shaped and each rotating body 14 is provided with a single roller 16. In turn, each roller 16 is connected in a rotating manner to a first end of a substantially cylindrical stem 20, whereas the second end of such a stem 20 is constrained to the structure to be moved.

According to the invention, the linear guide system 10 comprises at least one safety supporting device 22 constrained both to the structure to be moved and to one or more of the rotating bodies 14, and which encloses at least partially such one or more rotating bodies 14. The safety supporting device 22 is provided with one or more surfaces 28 that face the contact surface 18 of the guide element 12. Each surface 28 is configured in such a way that just a limited portion of the outer ring 30 surface of each roller 16 exits from the lower surface 28 of such a safety supporting device 22. Under the normal load conditions of the linear guide system 10, the safety supporting device 22 permits the normal linear motion of the rollers 16 along the contact surface 18 of the guide element, whereas, in the case in which a load higher than a given threshold is applied onto the linear guide system 10 such that at least one of the components of the rotating bodies 14 would be subjected to breakage, the safety supporting device 22 rests on the contact surface 18 of the guide element 12, discharging the load onto such a contact surface 18.

In detail, the second end of the stem 20 is constrained to the structure to be moved through the safety supporting device 22. The stem 20 may also be constrained with both its ends to the safety supporting device 22 by means of a fork connection.

In the embodiment shown in FIG. 1, the safety supporting device 22 is made of a prismatic casing having a rectangular section, in which at least one of the rollers 16 is constrained through a cylindrical hole 24 within which the stem 20 of such a roller 16 is housed. The second end of the stem 20, projecting from the body of the safety supporting device 22 to be constrained to the structure to be moved, is provided with a threaded portion in order to be in turn constrained to the safety supporting device 22 itself by means of a nut 26.

Each roller 16, under the normal load conditions provided for the same roller type, slides on the contact surface 18 of the guide element 12 having a rectangular section. The prismatic casing of the safety supporting device 22, of considerable thickness, is dimensioned in such a way that, under the normal load conditions of the linear guide system 10, the part S, related to the distance between the lower surface 28 of the safety supporting device 22 and the contact surface 18 of the guide element 12, is such that the normal sliding of each roller 16 on the guide element 12 is always possible by contact of the outer ring 30 surface of such a roller 16 with the contact surface 18 of the guide element 12.

The distance S is calculated in such a way to be less than the bending limit value to which each roller 16 and the related stem 20 may be subjected and which would lead to the breakage or yield point of the material of such a stem 20 and of such a roller 16 when the contact surface 18 of the guide element 12 and the lower surface 28 of the safety supporting device 22 come into contact. The distance S is also calculated in such a way as to be greater than the maximum bending value to which each roller 16 and the related stem 20 may be subjected when bearing the normal workloads of the linear guide system 10.

In the event of an exceptional load, the safety supporting device 22 comes into operation, eliminating the distance S between the lower surface 28 of the safety supporting device 22 and the contact surface 18 of the guide element 12, and bringing into contact these two surfaces to allow the discharge of the force onto such a contact surface 18.

The surface 28 of the safety supporting device 22 and the structure of the safety supporting device 22 itself are sufficiently dimensioned to withstand maximum provided loads without causing the crushing or deformation of the material of the safety supporting device 22 and of the guide element 12 when these are coupled on the contact 18 and lower 28 surfaces.

Once the exceptional load stress effect is over, the linear guide system 10 must return to the original position such that the distance S between the lower surface 28 of the safety supporting device 22 and the contact surface 18 of the guide element 2 is restored, again ensuring the proper operation of the linear guide system 10. This means that during the exceptional load event, the safety supporting device 22 must ensure that there are no permanent plastic deformations at one of the components of the linear guide system 10 such that, once the event is over, it is no longer possible to restore the normal translational conditions typical of the linear guide system 10.

Figure 2:
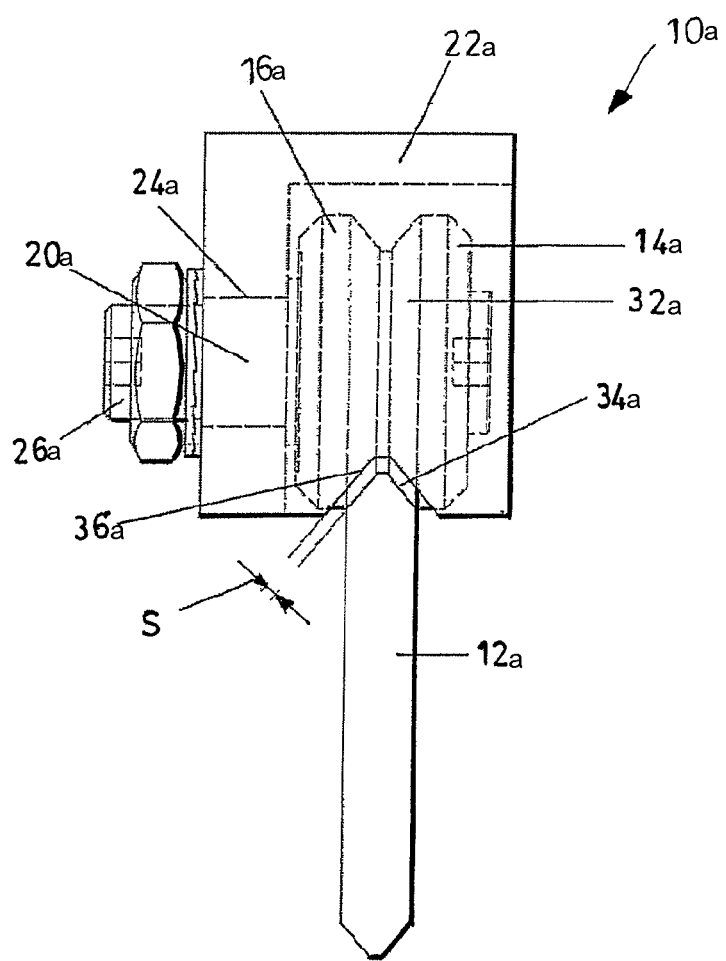
FIG. 2 is a side elevation view of a second embodiment of the mechanical linear guide roller system according to the present invention, provided with a single roller and a related profiled guide.

In FIG. 2 a second embodiment of the linear guide system 10a according to the present invention is shown. In this second embodiment, the outer ring 30a of each roller 16a is provided with a V-shaped in section throat 32a, whereas the guide element 12a is provided with a cusp-shaped contact surface 34a having a geometry complementary to that of said throat 32a. Consequently, also the safety supporting device 22a is provided with a lower surface 28a having a V-shaped notch 36a.

As with the first embodiment described in FIG. 1, under the normal operating conditions of the linear guide system 10a, the surface of the outer ring 30a of the roller 16a, provided with the throat 32a, is always in contact with the cusp-shaped contact surface 34 of the guide element 12a. Also in this embodiment, therefore, a possible load higher than a given threshold is discharged at the contact points between the V-shaped notch 36a and the lower surface 28a of the safety supporting device 22a and the cusp-shaped contact surface 34a of the guide element 12a. With this embodiment, as with the embodiment of FIG. 3 described below, the possibility of also withstanding axial loads is thus provided.

Figure 3:
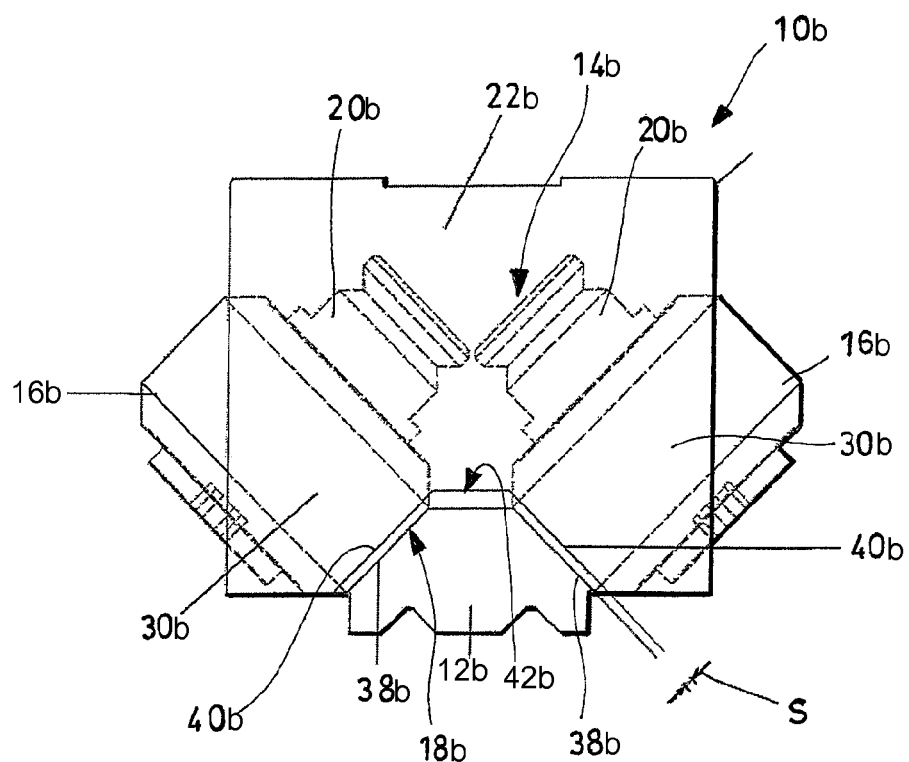
FIG. 3 is a side elevation view of a third embodiment of the mechanical linear guide roller system according to the present invention, provided with multiple rollers and a related profiled guide.

In FIG. 3 there is shown a third embodiment of the linear guide system 10b according to the present invention. In this third embodiment, each rotating body 14b is provided with two separate rollers 16b whose outer ring 30b is substantially cylindrical in shape.

In this third embodiment, the guide element 12b has a truncated pyramid sectional shape and the respective contact surface 18b is therefore divided into two distinct surface portions 38b which extend along two respective non-parallel planes. Between the two surface portions 38b there is interposed a joining portion 42b. Consequently, the safety supporting device 22b is also provided with a lower surface 28b having a truncated pyramid-shaped notch 40b.

Under the normal operating conditions of the linear guide system 10b, the surfaces of the outer rings 30b of the two rollers 16b slide respectively on two distinct surface portions 38b of the guide element 12b. A possible load higher than a given threshold is discharged at the contact points between the truncated pyramid-shaped notch 40b and the lower surface 28b of the safety supporting device 22b and the assembly which is made of the two surface portions 38b and of the joining surface 42b of the contact surface 18b of the guide element 12b.

It has thus been seen that the mechanical linear guide roller system according to the present invention achieves the objects highlighted previously. Indeed, it can be seen that there are no mobile elements to achieve the failure, equal to the distance S, of the safety supporting device 22. The failure, or juxtaposition between the contact surfaces 28 and 18 respectively of the safety supporting device 22 and of the guide element 12, occurs instead by elastic deformation of the sole mentioned components, without sliding between the parts. Therefore, the presence of additional components, as well as sliding surfaces, subject to wear, is not necessary.

The mechanical linear guide roller system of the present invention thus conceived is in any case subject to numerous modifications and variations, all of which fall under the same inventive concept; furthermore, all the details are replaceable by technically equivalent elements. In practice, the materials used, as well as the forms and dimensions, may be anything depending on technical needs.

The protection scope of the present invention is therefore defined by the appended claims.

The invention claimed is:

1. Linear guide system comprising a guide element and one or more rotating bodies, movable according to a linear motion along said guide element and constrained to a structure to be supported and moved along said guide element, wherein each rotating body comprises:

at least one roller provided with an outer ring the surface of which rotates resting on a contact surface of said guide element; and at least one substantially cylindrical stem, a respective roller being connected in a rotating manner to a first end of each stem, whereas the second end of said stem is constrained to the structure to be moved, the linear guide system comprising at least one safety supporting device constrained both to the structure to be supported and moved, and to one or more of the rotating bodies, said safety supporting device at least partially enclosing said one or more rotating bodies, wherein said safety supporting device it comprises one or more surfaces that face said contact surface, each surface of said safety supporting device being configured in such a way that only a limited portion of the outer ring surface of each roller exits from said surface of said safety supporting device so that, under normal load conditions of the linear guide system, the safety supporting device allows for the normal linear motion of the rollers along said contact surface, whereas in the case in which a load higher than a predetermined threshold is applied on the linear guide system such that at least one of the components of the rotating bodies would be subjected to breakage, the safety supporting device rests on said contact surface, discharging said load on said contact surface, wherein the safety supporting device is dimensioned in such that, under the normal loading conditions of the linear guide system, the surface of the safety supporting device is kept at a predetermined distance (S) from the contact surface of the guide element, said predetermined distance (S) being between:

the bending limit value to which each roller and the related stem may be subjected and which would lead to the breakage or yield point of the material of said stem and of said roller when said contact surface and surface of the safety supporting device come into contact, and the maximum bending value to which each roller and the related stem may be subjected when bearing the normal workloads of the linear guide system, said predetermined distance (S) being such that the normal sliding of each roller on said guide element by contact of the surface of the outer ring of said roller with said contact surface is always possible.

2. Linear guide system according to claim 1, wherein the second end of the stem is constrained to the structure to be supported and moved by means of the safety supporting device.

3. Linear guide system according to claim 1, wherein the stem is constrained with both its ends to the safety supporting device through a fork connection.

4. Linear guide system according to claim 1, wherein the guide element includes a flat guide having a rectangular section and the outer ring of each roller is substantially cylindrical-shaped.

5. Linear guide system according to claim 4, wherein the safety supporting device includes a prismatic casing having a rectangular section, in which at least one of the rollers is constrained through a cylindrical hole within which the stem of said roller is housed.

6. Linear guide system according to claim 1, wherein the outer ring of each roller is provided with a throat having a V-shaped section, and the guide element is provided with a cusp-shaped contact surface having a geometry complementary to that of said throat.

7. Linear guide system according to claim 6, wherein the safety supporting device includes a prismatic casing provided with a lower surface having a V-shaped notch, so that said load higher than a predetermined threshold is discharged at the contact points between said V-shaped notch and said cusp-shaped contact surface.

8. Linear guide system according to claim 1, wherein the second end of the stem protrudes from the safety supporting device in order to be constrained to the structure to be moved and it is provided with a threaded portion to be constrained in turn to said safety supporting device through a nut.

9. Linear guide system according to claim 1, wherein each rotating body is provided with two distinct rollers the outer ring of which is substantially cylindrical-shaped, and the guide element is truncated pyramid-shaped in section and the respective contact surface is thus divided into two distinct surface portions developing along two respective planes, not parallel, a joining portion being interposed between said two surface portions.

10. Linear guide system according to claim 9, wherein the safety supporting device includes a prismatic casing provided with a lower surface having a truncated pyramid-shaped notch, so that said load higher than a predetermined threshold is discharged at the contact points between said truncated pyramid-shaped notch and the assembly consisting of said two surface portions and said joining surface.

* * * * *